Figure 1:
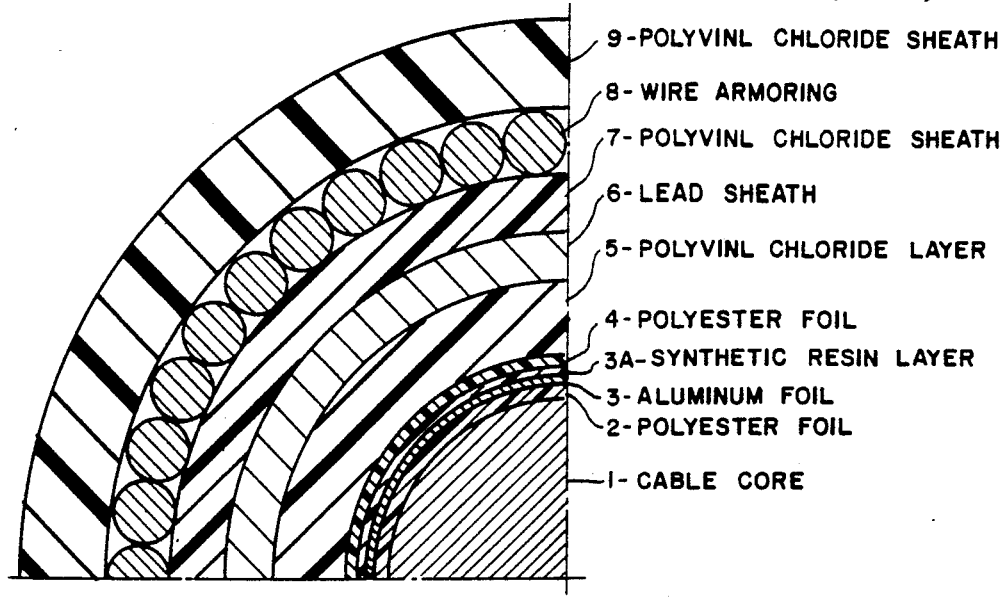

United States Patent [19]

Grooten

[11] Patent Number: 4,679,898
[45] Date of Patent: Jul. 14, 1987

[54] SIGNAL TRANSMISSION CABLE

[75] Inventor: Albertus T. M. Grooten, Waddinxveen, Netherlands

[73] Assignee: N.K.F. Groep B.V., Rijswijk, Netherlands

[21] Appl. No.: 776,328

[22] Filed: Sep. 16, 1985

[30] Foreign Application Priority Data

Sep. 18, 1984 [NL] Netherlands .................. 8402858

[51] Int. Cl.⁴ ..................... H01B 7/22; H01B 11/22
[52] U.S. Cl. .................. 350/96.23; 174/105 R; 174/107; 174/108
[58] Field of Search ............. 174/107, 108, 110 N, 174/105 R; 350/96.23

[56] References Cited

U.S. PATENT DOCUMENTS

| 2,980,755 | 4/1961 | Fairfield et al. | 174/108 |
| 3,006,787 | 10/1961 | Blewis et al. | 174/121 A X |
| 3,891,791 | 6/1975 | Schmidt | 174/107 |
| 3,950,605 | 4/1976 | Hori et al. | 174/107 |
| 4,278,835 | 7/1981 | Jackson | 350/96.23 X |
| 4,317,002 | 2/1982 | Spicer | 174/105 R |
| 4,510,346 | 4/1985 | Bursh, Jr. et al. | 174/107 X |

FOREIGN PATENT DOCUMENTS

| 2265108 | 11/1975 | France | 350/96.23 |
| 73701 | 5/1982 | Japan | 350/96.23 |

Primary Examiner—Morris H. Nimmo
Attorney, Agent, or Firm—Norman N. Spain

[57] ABSTRACT

A gas-tight and moisture-tight, mechanically strong signal transmission cable having a cable core and a cable sheath which comprises a metal tape folded around the core and having a minimum thickness of 100 μm, a layer of polyethylene adhering to the tape, a layer of polyamide-11 or polyamide-12, an armoring of reinforcing wires or tapes, and a synthetic resin outer sheath.

2 Claims, 2 Drawing Figures

SIGNAL TRANSMISSION CABLE

The invention relates to a signal transmission cable having a cable core of optical and/or electric conductors enveloped by a gas-tight and liquid-tight cable sheath.

An example of a signal transmission cable is a telephone cable or a control current cable.

Such a cable having electric conductors is known from German Offenlegungsschrift No. 2,237,095. According to this Offenlegungsschrift a so-called "Bespinnung" (spinning) is provided around the core but is not described in detail. This is enveloped by a thin metal layer, in particular an aluminium foil provided with a synthetic resin. On this thin metal layer a foamed synthetic resin layer of polyethylene or polyurethane is provided. The foamed synthetic resin layer is coated by a layer of a non-foamed, mechanically strong synthetic resin, in particular a layer of low-pressure polyethylene, propylene, polyurethane or polyamide of the nylon type. By such use of a hard synthetic resin top layer on a soft resilient foamed synthetic resin lower layer a better resistance against damage is obtained, for example, a better resistance to damage, for example, from nails.

It is an object of the present invention to provide a signal transmission cable which can withstand both organic substances, for example oils and organic solvents, and inorganic substances, such as aqueous solutions of acids, bases and salts. Furthermore, the cable must have a great mechanical strength. The cable according to the invention is meant in particular for industrial applications. It must be possible for the cable to be used as an individual unit and to be laid in the earth without the possibility of attack by the above-mentioned substances and without damage. It must be possible for the cable to be stored in the earth for years without loss of quality. The cable must also have a certain extent of flexibility particularly in connection with the reeling which is necessary for storage and transport.

A lead sheath construction has so far been used in such signal transmission cables. FIG. 1 of the accompanying drawing shows a known cable with a lead sheath construction. The use of a lead cable, in addition to being very expensive, makes the cable very heavy. The lead sheath is provided by extrusion at a high temperature. For the protection of the cable core, a thermal barrier in the form of a comparatively thick sheath of polyvinylchloride, must be placed between the core and the lead sheath. Lead has a low strength so that the lead sheath must be thick. For reinforcing purposes a metal armoring is provided around the sheath. A comparatively thick protective sheath of a synthetic resin is necessary between the lead sheath and the armoring. This requires that the diameter of the lead sheath cable be large. The cable according to the invention provides an excellent alternative to the lead-sheath cable and has for its important advantages a lower weight, a smaller diameter, a simpler manufacturing process, and a lower price.

The objects stated in the paragraphs hereinbefore are achieved by means of a cable of the type mentioned in the opening paragraph in which the cable sheath is constructed in the direction proceeding outwardly from the cable core to a metal tape of Al or Cu folded with overlap and having a minimum thickness of 100 μm which on the outside surface remote from the cable core comprises a synthetic resin layer adhering to the metal, a layer of polyethylene adhering to the synthetic resin layer, a layer of polyamide-11 or polyamide-12, an armoring of reinforcing wires or reinforcing tapes, and a synthetic resin outer sheath.

The starting point of the construction of the cable according to the invention is that each layer of the outer sheath has its own specific function.

The armoring of reinforcing wires or tapes provides the mechanical strength and resistance to damage. The armoring protects in particular the underlying layer of polyamide-11 or 12. The synthetic resin outer sheath protects the armoring from corrosion.

The layer of polyamide-11 or 12 ensures resistance against organic substances, in particular oils and organic solvents. The layer of polyamide-11 or 12 is provided by means of an extrusion process. The layer thickness is not essential. A suitable layer thickness is, for example, from 0.3 to 1 mm, for example, 0.5 mm. Polyamide-11 or 12 furthermore has a sufficient resistance against inorganic substances and moreover a low water absorption of 1% at a relative humidity of 65%. Polyamide-11 and 12 are substances known per se constructed from the structural unit

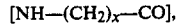

$$[NH-(CH_2)_x-CO],$$

wherein x has the value 10 or 11.

It is to be noted that it is known per se to use in cable constructions a layer of polyamide of the nylon type as a reinforcing layer which gives the cable the desired mechanical resistance. For such an application the well-known polyamide-6 (nylon-6) is used which has the highest tensile strength. However, this substance is not suitable as a chemical barrier layer due to the great moisture absorption of approximately 10% and the insufficient resistance to inorganic substances.

The layer of polyethylene used in the cable sheath according to the invention makes the cable withstand inorganic substances such as acids, bases and salts. It is essential that the layer of polyethylene to adheres to the metal tape comprising a synthetic resin layer because otherwise some moisture can still condense in the cavities formed.

In a favorable embodiment the polyethylene is a high-density-polyethylene. A high-density-polyethylene is a product known per se. The polyethylene is provided by means of an extrusion process. The layer thickness is not restricted to narrow limits and is, for example, from 0.5 to 2 mm.

The high-density-polyethylene has a better oil resistance as compared with low-density-polyethylene.

The metal tape used in the cable sheath according to the invention has the function of moisture barrier. Moreover, due to its impermeability the metal tape has a supporting function for the other layers in the cable sheath. The metal tape is preferably manufactured from aluminum and has a thickness of 100–300 μm. The overlapping edges of the metal tape can be bonded together by using adhesive. Also a layer of a synthetic resin such as polyethylene-acrylate copolymer can be extruded between the overlapping edges of the metal tape, this layer having an adhesive function. The edges are preferably sealed by using thermal energy. In that case the adhesive layer is formed by the layer of synthetic resin present on the metal tape. Synthetic resins which adhere well to the metal tape are sufficiently known. Preferably, a copolymer is used of polyethylene and at least a more polar synthetic resin, for example, an acrylate which shows a good bonding to the metal surface. The metal tape may bear a layer of synthetic resin either on one side or on both sides.

The layer of polyethylene used in the cable sheath adheres to the synthetic resin coating of the metal tape. Polyethylene shows an excellent bonding and fuses with the above-mentioned coating of polyethylene acrylate copolymer.

As already stated, the synthetic resin outer sheath provides protection to corrosion of the reinforcing wires or tapes. These wires or tapes are manufactured, for example, from steel or zinc-plated steel. The outer sheath may consist of PVC (polyvinyl chloride) and presents the advantage that the cable is fire-resistant or flame-retarding. The outer sheath is preferably manufactured from polyethylene and in particular from high-densitive polyethylene in which flame-retarding substances may be added to the polythene. Examples of flame-retarding substances are $Sb_2O_3$, bromine compounds, and the like. This means an extra protection against chemical attack is obtained on the outside of the cable sheath.

The cable core of the signal transmission cable according to the invention comprises optical and/or electric conductors. The optical conductors are glass fibers which are coated with a layer of synthetic resin, the so-called primary coating. By way of example, each glass fiber may be enveloped in a loose synthetic resin hose, the so-called secondary coating. The electric conductors are, for example, copper conductors insulated by a synthetic resin. The cable core formed from the optical and/or electric conductors may comprise an inner sheath of a synthetic resin which bundles the conductors.

In a favorable embodiment of the cable according the invention, one or more foils wound around the cable core are applied between the cable core and the metal tape. Suitable foils are synthetic resin foils, for example, polyester foils.

The invention now be described in greater detail with reference to the drawing, in which FIG. 1 is a cross-sectional view of a part (sector) of a known lead sheath cable.

Figure 2:
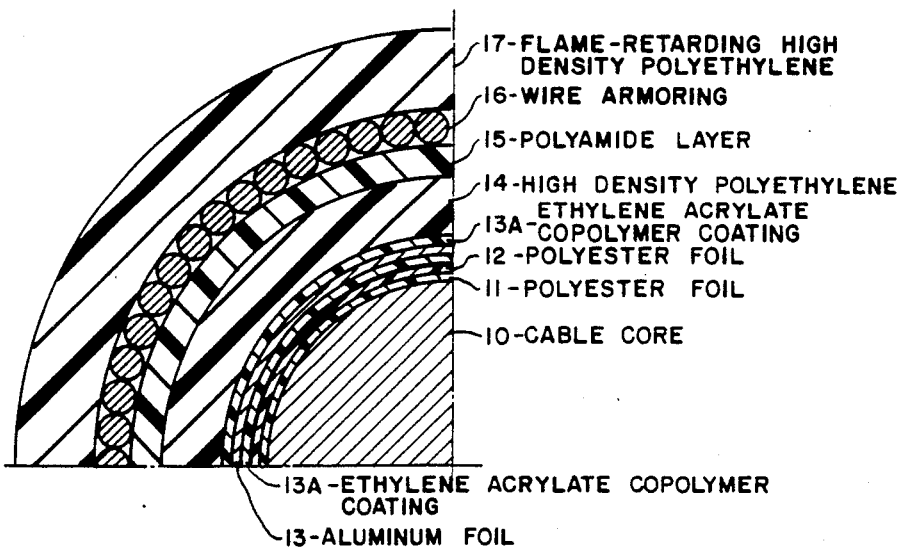

FIG. 2 is a cross-sectional view of a sector of a cable according to the invention.

Reference numeral 1 in FIG. 1 denotes a cable core which is built up from 24 pairs of twisted insulated copper conductors which are not shown in the Figure. The core has a diameter of 16.5 mm. A polyester foil 2 having a thickness of 0.023 mm, an aluminium foil 3 comprising a layer of synthetic resin 3A on one side and having a thickness of 0.024 mm, and a polyester foil 4 having a thickness of 0.023 mm are wound around the core. A layer 5 of polyvinyl chloride is provided around the last-mentioned foil 4 by means of an extrusion process. Layer 5 is covered with an extruded lead sheath 6 having a thickness of 1.35 mm which in turn is enveloped by a 1.6 mm thick protective sheath 7 of polyvinyl chloride. An armoring of zinc-plated steel wires 8 is provided around sheath 7. The steel wires have a diameter of 1.6 mm. On its outside the cable is protected by a 2.1 mm thick outer sheath 9 of polyvinyl chloride. The diameter of the cable shown in FIG. 1 is 34.1 mm. Its weight is 2,700 kg per km. The cable shown in FIG. 1 has good mechanical properties, in particular a good tensile strength and moreover is moisture-tight and gas-tight. A disadvantage is that the cable has a comparatively large diameter, is heavy, difficult to produce, and expensive.

FIG. 2 shows a cable according to the invention. Reference numeral 10 in the Figure denotes a cable core which is identical to the core of FIG. 1. Thus the diameter of the core is 16.5 mm. Two polyester foils 11, 12 each having a thickness of 0.023 mm are wound around the core. Instead of the outer foil of said two polyester foils, an aluminum foil having a layer of a synthetic resin on its outside and an overall thickness of 0.024 mm may be folded around the core. This foil serves as a round. If desired, an ground wire, for example, a copper wire, may be provided between the aluminium foil and the polyester foil wound directly around the core. As a result it is achieved that in the case of damage, for example, fissures, in the foil, the electric screening effect is maintained. The ground wire may also be used for making ground connections. An aluminum tape 13 is folded around polyester foil 12 with overlap. The width of the aluminum tape is 60 mm. The thickness is 0.23 mm. The overlap is 5 mm. The tape comprises on each side a coating of an ethylene-acrylate copolymer 13A each coating being approximately 0.005 mm thick. The overlap is sealed by applying thermal energy. A layer of high-density polyethylene 14 is provided over the aluminium tape 13 by extrusion, the layer of polyethylene fusing with the coating of the aluminium tape, so that layer 14 adheres to aluminum tape 13. Layer 14 has a thickness of 1.2 mm. A 0.5 mm thick layer 15 of polyamide-12 is extruded over layer 14.

An armoring of zinc-plated steel wires 16 each having a diameter of 1.0 mm is provided over layer 15. The armoring is coated by an outer sheath 17 of flame-retarding high-density-polyethylene. The outer sheath has a thickness of 1.9 mm. The overall diameter of the cable shown in FIG. 1 is 26.4 mm.

The FIG. 2 cable has excellent mechanical properties with, for example, a tensile strength of 7000N. The minimum radius of curvature of the FIG. 2 cable is 15×the outside diameter. The weight is 1,075 kg/km.

The FIG. 2 cable is moisture-tight and gas-tight and can withstand oils, solvents, for example toluene, benzene, xylene and chemicals such as acids and bases.

What is claimed is:

1. A signal transmission cable having a cable core of optical and/or electric conductors enveloped by a gas-tight and liquid-tight sheath, said sheath comprising, in the direction outwardly from said core, an overlapped layer of a metal tape of a thickness of at least 100 $\mu$m of aluminum or copper, a layer of a synthetic resin adhering to the surface of said metal tape remote from said core, and surrounding said metal tape, a layer of high-density polyethylene adhering to, and surrounding said synthetic resin layer, a layer of polyamide-11 or polyamide-12 provided on and surrounding said layer of polyethylene, an armoring of reinforcing wires or reinforcing tapes surrounding said layer of said polyamide and an outer sheath formed of a synthetic resin surrounding said armoring.

2. The signal transmission layer of claim 1 in which the outer sheath is formed of high-density polyethylene containing flame-retarding agents.

* * * * *